US005301970A

United States Patent [19]

Haskins

[11] Patent Number: 5,301,970

[45] **Date of Patent: * Apr. 12, 1994**

[54] COLLAPSIBLE WHEELCHAIR FRAME CONSTRUCTION

[76] Inventor: John T. Haskins, 18721 Mantle La., Roland, Ark. 72135

[*] Notice: The portion of the term of this patent subsequent to Dec. 31, 2008 has been disclaimed.

[21] Appl. No.: 815,343

[22] Filed: Dec. 27, 1991

Related U.S. Application Data

[63] Continuation-in-part of Ser. No. 547,199, Jul. 3, 1990, Pat. No. 5,076,390.

[51] Int. Cl.[5] .............................................. B62M 1/14

[52] U.S. Cl. .............................. 280/250.1; 280/304.1; 280/650; 280/657

[58] Field of Search ............... 280/250.1, 304.1, 47.25, 280/47.38, 47.41, 79.2, 647, 650, 657; 297/DIG. 4, 16, 17, 42

[56] References Cited

U.S. PATENT DOCUMENTS

| | | | |
|---|---|---|---|
| D. 269,172 | 5/1983 | Minnebraker | D12/131 |
| D. 271,679 | 12/1983 | Minnebraker | D12/131 |
| D. 277,949 | 3/1985 | Minnebraker | D12/131 |
| 948,349 | 2/1910 | Settle | 280/298 |
| 3,584,890 | 6/1971 | Presty | 280/71 |
| 3,847,440 | 11/1974 | Mattsson | 301/1 |
| 3,881,773 | 5/1975 | Rodaway | 297/377 |
| 3,953,054 | 4/1976 | Udden et al. | 280/242 |
| 3,990,745 | 11/1976 | Rodaway | 297/444 |
| 3,993,351 | 11/1976 | Rodaway | 297/422 |
| 4,025,088 | 5/1977 | Rothchild | 280/644 |
| 4,082,348 | 4/1978 | Havry | 297/45 |
| 4,098,521 | 7/1978 | Ferguson et al. | 280/242 |

(List continued on next page.)

FOREIGN PATENT DOCUMENTS

| | | | |
|---|---|---|---|
| 2517418 | 11/1976 | Fed. Rep. of Germany | 297/DIG. 4 |
| 2703727 | 8/1978 | Fed. Rep. of Germany | 180/907 |
| 1517311 | 7/1978 | United Kingdom | 180/907 |
| 2048791 | 12/1980 | United Kingdom | 280/250.1 |

*Primary Examiner*—Margaret A. Focarino
*Assistant Examiner*—Anne Boehl
*Attorney, Agent, or Firm*—Stephen D. Carver; J. L. Mahurin

[57] ABSTRACT

A collapsible wheelchair conveniently switchable between deployed and stowage modes resists bending and torsional distortion. The wheelchair narrows for negotiating narrow airplane aisles, and it may be broken down or reassembled in the field without special tools. A rigid, generally cubicle, wheeled frame is foldable between deployed and retracted orientations. Drive wheels can be independently removed to narrow the wheelchair to clear restricted spaces. The frame supports a removable chair equipped with removable arm rests and an adjustable foot rest. The chair is mounted to a power pack centered between the opposite frame sides and mechanically interconnected by a pair of similar, spaced apart parallelogram linkages. The power pack comprises a pair of synchronized pneumatic cylinders coaxially disposed within separate tubular, extensible sleeves. Each parallelogram linkage comprises separate metallic links occupying a plane perpendicular to the frame sides for synchronizing side movement. Dynamic alignment and squareness are encouraged by a separate foldable brace system that comprises twin pairs of flat metallic links pivoted to the frame sides. The brace links occupy a plane that is parallel with and offset from the ground and generally perpendicular to the plane occupied by the parallelogram links. The brace links include critical locking orifices adapted to register w suitable locking pins projecting upwardly from a manually displaceable shelf when the frame is to be deployed. A foldable extension limiting system dynamically encourages frame squareness. Alignment of the frame is insured by the mutually orthogonal relationship of the moving parts.

6 Claims, 3 Drawing Sheets

U.S. PATENT DOCUMENTS 4,164,354 8/1979 Rodaway .............................. 280/42
4,166,631 9/1979 Sanaski ................................ 280/242
4,273,350 6/1981 Williams .............................. 280/647
4,326,732 4/1982 Gall et al. ........................... 280/642
4,351,540 9/1982 Minnebraker ....................... 280/242
4,371,183 2/1983 Dion ..................................... 280/42
4,392,690 3/1984 Anderson ............................ 301/121
4,474,385 10/1984 Costello et al. .................... 280/242
4,477,098 10/1984 Minnebraker ....................... 280/242
4,477,117 10/1984 Higgs ................................... 297/45
4,515,383 5/1985 Minnebraker ....................... 280/242
4,527,829 7/1985 Fanslau et al. ....................... 297/16
4,542,918 9/1985 Singleton ............................ 280/242
4,545,593 10/1985 Farnam ............................... 280/242
4,577,878 3/1986 Roy et al. ............................ 280/242
4,582,448 4/1986 Costello et al. ..................... 403/324
4,592,570 6/1986 Nassiri ................................ 280/650
4,595,212 6/1986 Havry et al. ........................ 280/242
4,607,860 8/1986 Vogel ................................. 280/650
4,639,012 1/1987 Jensen ................................ 280/642
4,648,615 3/1987 Volin .................................. 280/242
4,648,619 3/1987 Jungnell et al. ..................... 280/557
4,678,202 7/1987 Jensen et al. ....................... 280/642
4,679,862 7/1987 Luo .................................... 301/112
4,684,171 8/1987 Roy et al. ............................ 297/47
4,730,842 3/1988 Summers et al. ................... 280/638
4,736,960 4/1988 Batty et al. ........................... 280/42
4,840,390 6/1989 Lockard et al. ................. 280/250.1
5,076,390 12/1991 Haskins ........................... 280/250.1
5,112,076 2/1990 Wilson ......................... 297/DIG. 4

COLLAPSIBLE WHEELCHAIR FRAME CONSTRUCTION

CROSS REFERENCE TO RELATED APPLICATIONS

This application is a continuation in part of my previously filed U.S. patent application Ser. No. 547,199, filed Jul. 3, 1990, and entitled Multiple Mode Wheelchair Construction which issued as U.S. Pat. No. 5,076,930 on Dec. 31, 1991.

BACKGROUND OF THE INVENTION

The present invention relates generally to collapsible wheelchairs and wheelchair frame assemblies that may be deployed in alternative configurations. More particularly, the present invention relates to wheelchairs that can be narrowed by the user for passage through restricted areas, or foldably retracted into a convenient stowage disposition.

Conventional wheelchairs can be vexatiously difficult to maneuver, particularly where small, confined areas must be traversed. Business persons confined to wheelchairs who must frequently travel are faced with a variety of obstacles The complications presented by stairs, escalators and metal detectors are only part of the problem Ordinary difficulties encountered by wheelchair users when traveling through crowded airports can be overshadowed by the problems in boarding the aircraft The narrow aisles of commercial aircraft are a significant impediment to the traveling wheelchair user. Such individuals usually must check their personal wheelchair as baggage, thus limiting personal autonomy and comfort. The physical assistance of airline personnel or others is subsequently required Most airlines attempt to accommodate wheelchair-confined passengers by temporarily substituting lightweight, low, profile wheelchairs of reduced dimensions. Such chairs facilitate unobstructed clearance and passage through the narrow aisles. Exemplary of such "temporary" airline wheelchairs are those chairs depicted in U.S. Pat. No. 4,639,012 and 4,678,202 issued to Jenson on Jan. 27, 1987 and Jul. 7, 1987, respectively. In my opinion such prior art wheelchairs are designed strictly for short-term use, and besides aggravating the user, they provide minimal comfort. All such prior art wheelchairs known to me are ineffective for long-term, everyday use.

One major disadvantage associated with temporary airline wheelchairs is that the handicapped passenger has no opportunity to move about independently in the plane after he is seated. After seating, the chair is stowed out of reach. Moreover, considerable inconvenience and delay are experienced after landing, since the handicapped passenger must wait to be transported by the airline staff to the terminal. Once the destination is reached, the handicapped user must switch back to his everyday wheelchair. First, however, he must endure the inevitable delays associated with retrieval of his chair.

Many find this loss of independence extremely inconvenient and uncomfortable. Hence it is desired to provide a full-size wheelchair which can be quickly disassembled and carried with the, passenger for storage on board the aircraft. Additionally, it is desired to provide such a wheelchair which may be selectively configured at will to enable the individual to move about independently in space-restricted areas such as airline aisles and the like.

Known conventional wheelchairs are also inconvenient for use in the typical business office. Efficient access to office desks, file cabinets, computer tables, and book shelves is generally compromised for the wheelchair-using business person. Elevated service counters in restaurants, stores, and banks are also typically out of reach of the individual seated in a wheelchair. Similarly, it is difficult for those in wheelchairs to comfortably approach conventional lecterns or podiums found in courtrooms or other public places. It is also extremely difficult for such individuals to comfortably mount popular vehicles such as jeeps, vans, and pick-up trucks Thus the wheelchaired individual experiences inconvenience, loss of independence, discomfort, and delay in conducting routine business transactions. But to make matters worse, conventional wheelchairs also hinder the handicapped individual in the performance of countless routine household tasks. For example, elevated kitchen cabinets, closet and refrigerator shelves, and other storage facilities are generally out of reach. Hence it is desired to provide a wheelchair which may be conveniently user-adjusted and/or configured to enable access to all types of areas encountered in various business and household settings.

A further disadvantage associated with known prior art wheelchairs is that the large wheels are permanently positioned on the rear of the frame. The user must remain in the same awkward position, with the torso extended forward and the arms reaching backward to propel the chair. After extended periods of use the individual's arms, back, and shoulders can tire and become strained. Additionally, it is often quite difficult to maneuver the chair comfortably with the drive wheels in the rear. Hence it is desired to provide a wheelchair which may be readily reversibly oriented at the user's option so that the large drive wheels are in front for comfort and enhanced maneuverability.

Over the years, various improvements have been introduced to overcome difficulties experienced in maneuvering wheelchairs. For example, a wide variety of folding wheelchairs have been proposed in the prior art which facilitate convenient storage for travel. Foldable wheelchairs are disclosed in the following U.S. Pat. Nos. 4,025,088, issued May 24, 1977 to Rothschild; U.S. Pat. No. 4,326,732, issued to Gall Apr. 27, 1982; Dion U.S. Pat. No. 4,371,183 issued Feb. 1, 1983; U.S. Pat. No. 4,542,918 issued to Singleton on Sep. 24, 1985; U.S. Pat. No. 4,577,878 issued to Roy Mar. 25, 1986; U.S. Pat. No. 4,607,860 issued Aug. 26, 1986 to Vogel; U.S. Pat. No. 4,684,171 issued Aug. 4, 1987 to Roy, U.S. Pat. No. 4,736,960 issued to Batty, Apr. 12, 1988; and Design U.S. Pat. No. D277,949, issued Mar. 12, 1985 to Minnebraker. Nassiri, U.S. Pat. No. 4,592,570 issued Jun. 3, 1986 comprises means for adjustment of seat orientation and convenient quick-release wheels to facilitate folding.

Other improvements are directed to enhanced wheelchair comfort. Rodaway, U.S. Pat. No. 3,881,773 issued May 6, 1975 employs a reclining back; Rodaway U.S. Pat. No. 3,990,745, issued Nov. 9, 1976 teaches the use of a removable back to facilitate convenient transfer from the wheelchair to a bed or other support. Presty U.S. Pat. No. 3,584,890 issued Jun. 15, 1971 comprises an arm rest assembly which may be removed and used as a walker to assist the wheelchair patient in rising from the chair.

Minnebraker U.S. Pat. Nos. 4,351,540 (Sep. 28, 1982); U.S. Pat. No. 4,515,383 (May 7, 1985); U.S. Pat. No. 4,477,098 (Oct. 16, 1984); U.S. Pat. No. D269,172 (May 31, 1983); and U.S. Pat. No. D271,679 (Dec. 6, 1983) disclose wheelchairs which can be readily adapted for use by individuals of different sizes and physical capabilities. The Minnebraker designs are also ideally suited for participation in wheelchair sports activities. Other wheelchairs specifically directed to use for sporting activities are proposed by Sanaski, U.S. Pat. No. 4,166,631, issued Sep. 4, 1979; and Farnam, U.S. Pat. No. 4,545,593 issued Oct. 8, 1985. The seat of the last-mentioned Farnam chair may be selectively adjusted for comfortable height and tilt.

Various others have directed their attention to providing width-adjustable chairs specifically for navigating narrow passageways. Haury, U.S. Pat. No. 4,082,348 issued Apr. 4, 1978 comprises adjustable transverse frame members cooperative with flexible seat members to facilitate width adjustment U.S. Pat. No. 4,730,842 issued Mar. 15, 1988 to Summers teaches the use or split clamps for facilitating horizontal adjustments to the seat. Pivotal foot plates facilitate convenient passage through narrow areas. The reduced-width wheelchair disclosed by Rodaway in U.S Pat. No. 4,164,354 issued Aug. 14, 1979 comprises a scissor-type foldable frame which mounts the front and rear wheels in parallel alignment. Volin U.S. Pat. No. 4,648,615 issued Mar. 10, 1987 comprises rotatable arm supports which may be pulled inward to narrow the wheelchair frame for enabling passage in space-restricted areas.

One prior art patent of particular relevance to my invention is Ferguson U.S. Pat. No. 4,098,521 issued Jul. 4, 1978. When the large rear wheels of the Ferguson chair are removed, the chair may be tilted to engage secondary wheels mounted in alignment with the narrow interior frame. The arm and foot rests may be conveniently pivoted away or removed to substantially reduce the overall width. While the chair is highly maneuverable, it presents certain disadvantages. For example, the Ferguson chair comprises a rather cumbersome framework with secondary drive linkage and foot pedal adjustments Moreover, there are no convenient means suggested for effectuating seat width or height adjustments. Use of hand-operated levers associated with either side of the chair is also rather disadvantageous. Finally, some difficulty is encountered in manipulating the rear wheel release mechanism.

Finally, in the prior art known to me, various systems are proposed for facilitating quick-release of the chair rear wheels for storage or conversion to a narrower frame. Patents of some relevance to my invention are U.S. Pat. No. 3,847,440 issued Nov. 12, 1974 to Mattson; Anderson, U.S. Pat. No. 4,392,690, issued Jul. 12, 1983; U.S. Pat. No. 4,474,385 issued to Costello on Oct. 2, 1984; and, Costello U.S. Pat. No. 4,582,448 issued Apr. 15, 1986; U.S. Pat. No. 4,679,862 issued Jul. 14, 1987 to Luo.

The chair described in my above-referenced co-pending patent application greatly improves an individual's ability to adapt to a variety of situations. However, sometimes the collapsing, foldable frame sections may bind somewhat where the user fails to maintain alignment. The instant chair frame construction solves frame alignment problems, makes it easier to collapse or unfold and deploy the frame, more readily facilitates stowage, and improves the individual's ability to adapt the chair for a variety of situations. Additionally, this improved version allows the seat back to lock more securely to the seat base after assembly or disassembly.

SUMMARY OF THE INVENTION

I have invented an improved wheelchair having a collapsible frame that can be conveniently switched between deployed and stowage modes. It is ideally adapted for traveling on airplanes, and it may assume a reduced width configuration for negotiating narrow airplane aisles.

A rigid, generally cubicle frame is foldable between deployed and retracted orientations. The frame includes a wheel system comprising removable drive wheels, spaced apart caster wheels, and adjustable auxiliary wheels. The frame supports a removable chair equipped with removable arm rests and an adjustable foot rest. The caster wheels or the main drive wheels can be removed by the operator when the frame is collapsed for stowage. The drive wheels can be independently removed to narrow the wheelchair to negotiate relatively narrow spaces such as airplane aisles. When the drive wheels are removed the auxiliary wheels provide support for the frame in conjunction with the caster wheels.

The rigid, metallic frame sides can be folded towards or away from each other to deploy or fold the frame. The frame mounts a removable seat that is fastened to a power pack comprising a pair of synchronized, pneumatic cylinders. The cylinders are centered between the opposite frame sides, and mechanically interconnected by a pair of similar, spaced apart parallelogram linkages. Each parallelogram linkage comprises four flat, metallic links occupying a plane perpendicular to the frame sides and the ground. The linkages help synchronize the apparatus and maintain the sides in alignment when frame stowage is desired.

The power pack comprises a pair of separate, cooperating pneumatic cylinders that are coaxially disposed within separate tubular, telescoping sleeves. The sleeves include a lower tubular member that coaxially, telescopingly receives an upper, extensible sleeve member. As the parallelogram linkages move when the frame sides are folded together, the sleeve members will elongate by telescoping outwardly from one another. The pneumatic cylinders secured telescopingly within the sleeve system are synchronized by a cross plate. The actuating valves projecting out of the cylinders are selectively actuated by a lever system accessible to the user beneath the chair.

Dynamic alignment of the frame is encouraged by a separate brace system during folding and unfolding. During retraction of the frame system it is important that the sides maintain substantially evenly spaced apart parallel orientation, and that the individual parallelogram linkage members fold at the same rate. The brace system comprises twin pairs of generally flat metallic links pivoted together at one end, and pivoted at their opposite ends to the frame sides. The flat brace links occupy a plane that is parallel with and offset from the ground, and which is generally perpendicular to the plane occupied by the parallelogram links.

The brace links include critical locking orifices adapted to register with suitable locking pins when the frame is to be erected. When the frame is deployed these locking orifices are penetrated by the locking pins that properly register therewith when the frame is configured properly. The pins project upwardly from a displaceable shelf that is operatively mounted to the power pack. The shelf may be manually grasped and pressed downwardly against yieldable pressure from spring mounts which normally urge the shelf toward an engaging position. As the shelf deflects downwardly, its locking pins will be retracted, freeing the brace links. When the pins are withdrawn, the frame may be pushed together To readily facilitate registration of the brace orifices with the locking pins, and to dynamically maintain frame "squareness" I have provided a resilient, extension limiting system. Extension limiting is accomplished by a pair of cooperating flexible, chains extending from the frame sides to the power pack. The chains readily deform when the frame sides are folded together, but they elongate and become tensioned when the frame sides are drawn apart. In so doing they help maintain the frame in proper alignment, and they tend to preserve squareness so that a bind is avoided.

Proper alignment of the frame is insured by the mutually orthogonal relationship of the moving parts. The flat parallelogram links occupy a plane that is substantially perpendicular to the floor. The plane occupied by the flat brace links is substantially parallel with the floor and perpendicular to the plane occupied by the frame sides. This relationship tends to prevent bending, and torsional deformations of the frame during folding or unfolding are vigorously resisted.

Thus it is a fundamental object of the present invention to provide an improved wheelchair frame assembly that easily folds or unfolds without binding.

A basic object is to provide a wheelchair having a frame of the character described that enables convenient passage through and access to areas generally inaccessible to conventional wheelchairs.

A similar basic object of the present invention is to provide wheelchair that may be readily adjusted by the user for convenient maneuvering through narrow passageways such as airline aisles and the like.

Another broad object is to provide a wheelchair that may be conveniently adjusted or configured by the user to facilitate ergonomic access to conventional fixtures and furniture likely to be found in a typical business office.

Another important object is to provide a collapsible wheelchair of the character described that facilitates comfortable and convenient airline travel.

Another important object is to maintain the "squareness" of a collapsible wheelchair frame during folding and unfolding. It is a feature of my invention that the frame sides are maintained substantially evenly spaced apart in a parallel orientation, by both the individual parallelogram linkages and the foldable bracing system.

A related object is to provide a full-size wheelchair that can be quickly reconfigured and carried with the passenger for stowage on commercial aircraft.

Still another basic object of the present invention is to provide a wheelchair in which both the seat height and the carriage width may be readily adjusted for enhanced maneuverability and comfort.

A further object of the present invention is to provide a wheelchair that permits quick and easy removal of the main wheels for passage through narrow areas.

Another object of the present invention is to provide a wheelchair that may be reversibly oriented with the large drive wheels in front.

A similar object of the present invention is to provide a wheelchair of the character described which may be readily adjusted and reversibly oriented by the user without the use of special tools.

A related object of the present invention is to provide a wheelchair that may be comfortably used by quadriplegics having severe restriction of the upper extremity as well as by paraplegics having strong upper arms.

Yet another object of the present invention is to provide wheelchairs of the character described on which the seat may be selectively lowered or elevated to permit access to hard-to-reach areas.

A related object is provide a wheelchair that facilitates access to service counters, shelves, vehicles, office equipment, and other generally inaccessible areas.

A further object is to provide a collapsible wheelchair frame for convenient storage and transport.

An additional object of the present invention is to provide a wheelchair with a pneumatic seat lifting system for convenient carriage adjustment.

Another object is to provide a release system that locks the seat back more securely to the seat base.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE DRAWINGS

Figure 1:
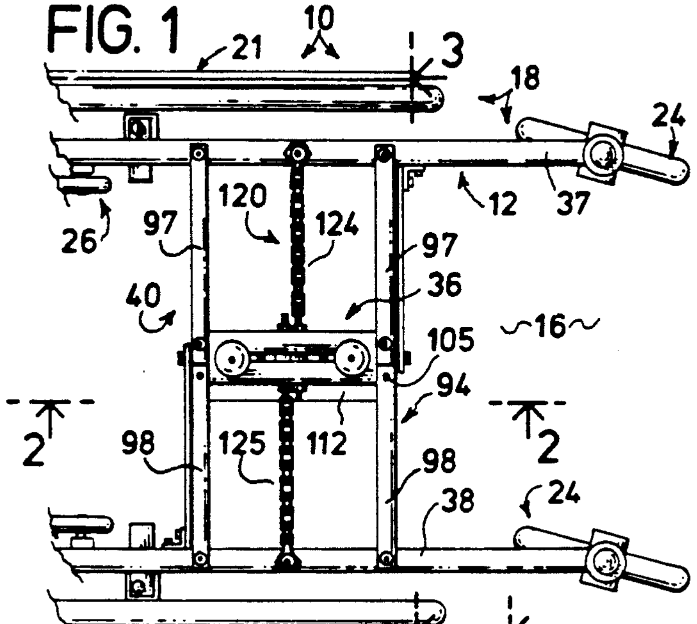
FIG. 1 is a fragmentary, top plan view of my improved collapsible, wheelchair frame system constructed in accordance with the best mode of the invention, with the frame deployed in the locked, operative position.

With initial reference now directed to FIGS. 1 through 6 of the appended drawings, my improved, collapsible wheelchair has been broadly designated by the reference numeral 10. At the outset it should be appreciated that finer details and structure incorporated herein have been previously explained in detail in my co-pending patent application Ser. No. 07/547,199, filed: Jul. 3, 1990, and entitled Multiple Mode Wheelchair Construction, U.S. Pat. No. 5,076,390, which is hereby incorporated by reference herein.

Figure 2:
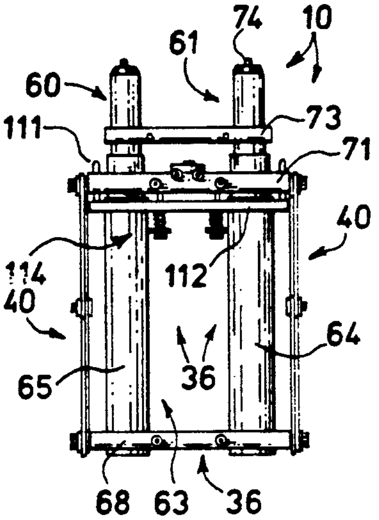
FIG. 2 is a fragmentary, sectional view of the frame taken generally along line 2—2 of FIG. 1.
Figure 4:
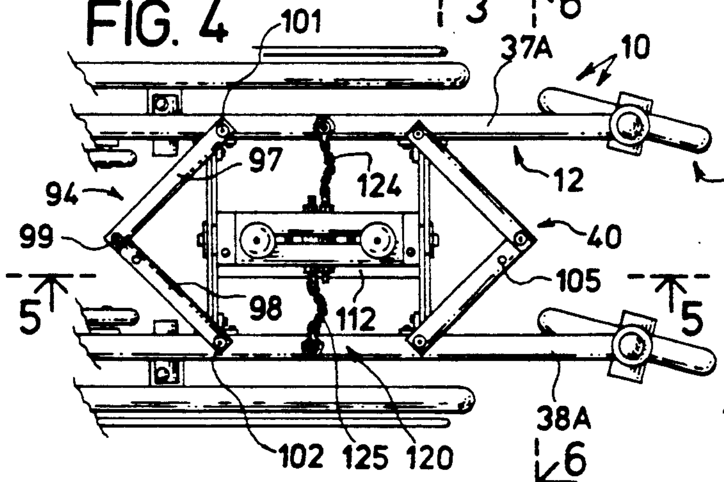
FIG. 4 is a fragmentary, top plan view similar to FIG. 1, but showing he frame deployed in the folded position.
Figure 5:
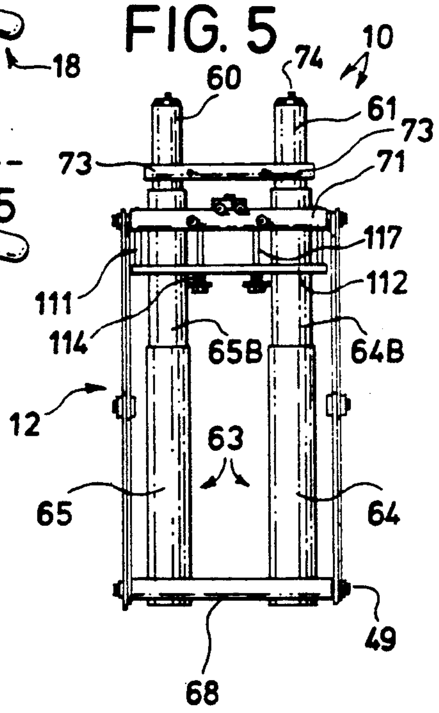
FIG. 5 is a fragmentary, sectional view taken generally along line 5—5 of FIG. 4, with the locking shelf disposed in an unlocked position.

Wheelchair 10 comprises a frame, generally designated by the reference numeral 12, which is foldable between the deployed orientation of FIGS. 1 and 2, and the retracted orientations of FIGS. 4 and 5. The frame is supported above lower surface 16 by a wheel system generally designated by the reference numeral 18. Wheel system 18 (FIG. 1) comprises removable drive wheels 21, caster wheels 24, and auxiliary wheels 26, all of which were described in detail in my prior patent. Caster wheels 24 or the main drive wheels 21 can be conveniently removed by the operator prior to collapsing the frame for stowage. When negotiating narrow airplane aisles, for example, the drive wheels are removed and the auxiliary wheels 26 provide support for the frame. They can be vertically displaced by the operator to level the frame.

Figure 3:
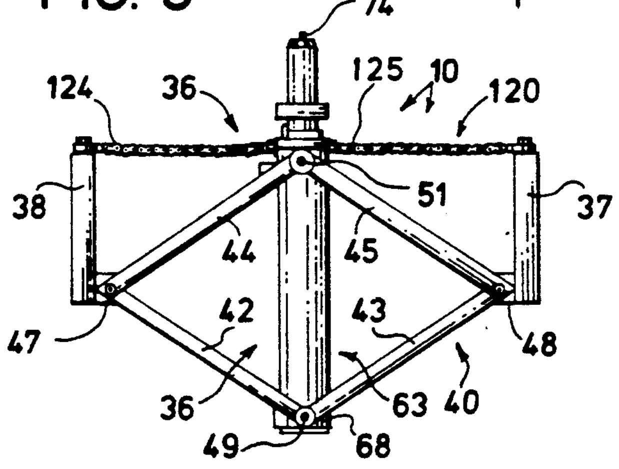
FIG. 3 is a fragmentary, sectional view of the frame taken generally along line 3—3 of FIG. 1.

The frame 12 mounts a removable chair, generally designated by the reference numeral 30 (FIG. 7), which will be described in detail hereinafter. Chair 30 is upwardly displaceable by a power pack generally designated by the reference numeral 36, which is centered between the opposite frame sides 37, 38 (FIGS. 1, 3). The frame sides 37, 38, can be folded towards or away from each other, primarily as a result of the parallelogram linkage system linking the power pack to the frame sides.

A pair of separate, spaced apart parallelogram linkages 40 interconnect the frame sides and are disposed at each end of the power pack 36. Each side of the linkage 40 includes a plurality of flat, metallic links (i.e., nominally four) such as links 42–45. Bottom parallelogram linkage members 42 and 43 are both pivotally coupled to each other at junction 49. Their opposite ends are pivoted to appropriate tabs 47, 48 at the bottom of frame sides 38, 37 respectively. The upper parallelogram links 44, 45 are similarly pivoted to the power pack assembly 36 at junction 51. This helps synchronize the apparatus and maintain the sides in alignment when frame stowage is desired.

The power pack apparatus 36 was previously described in detail in my above referenced patent. In the best mode known to me it comprises a pair of separate, cooperating pneumatic cylinders 60, 61 that are coaxially disposed within separate tubular, telescoping sleeves 63. The sleeves include a lower tubular members 64 and 65 secured to and emanating upwardly from a lower support block 68. Sleeve member 64 and 65 telescopingly, coaxially receive upper, extensible sleeve members 64B and 65B respectively. The upper sleeve members 64B and 65B are secured to an upper support block 71 that extends across their tops. With reference to FIGS. 4 and 5, as the parallelogram linkages 40 move when the frame sides are folded together, the sleeves will elongate. Sleeve members 65 and 65B, for example, will telescope outwardly from one another. Pneumatic cylinders 60 and 61 are secured telescopingly within sleeve members 64B and 65B, and they are synchronized by a cross plate 73 extending therebetween. As described in my parent patent the valves 74 emanating from the top of the cylinders can be released by the actuating lever arm 79 (FIG. 7) which ultimately rocks rod 80 (FIG. 8) within mounting block system 82 to be hereinafter described.

It is important to maintain substantial alignment of the operative frame parts during folding and unfolding. In other words, during the retraction of the frame system it is important that the sides maintain substantially evenly spaced apart parallel orientation, and that the individual parallelogram linkage members 40 fold in approximately at the same rate. To thus insure folding synchronization, I have provided foldable brace means generally designated by the reference numeral 94 for dynamically aligning the frame sides.

As best seen in FIGS. 1 and 4, brace means 94 comprises a pair of generally flat metallic links 97 and 98 pivoted together at 99 at one end, and having opposite ends pivoted at 101 and 102 to the tops 37A and 38A of the frame sides. Importantly, the brace links 98 include critical locking orifices 105. When the frame is deployed these locking orifices are penetrated by suitable locking pins 111 (FIGS. 2 and 5), emanating upwardly from a displaceable lever comprising a shelf 112 (FIG. 2) that is mounted to and spaced apart from the power pack upper support block 71. As viewed in FIGS. 1 and 4, shelf 112 projects outwardly from the power pack, and it may be manually grasped and pressed downwardly against yieldable pressure from springs 114 captivated upon stabilizer rods 117. As shelf 112 moves downwardly it is dynamically aligned by the twin stabilizer rods 117 which slidably penetrate suitable orifices in the shelf. Locking pins 111 will be drawn downwardly, freeing orifices 105 in the dynamic brace links 98. When pins 111 are withdrawn, the frame may be pushed together (i.e., as in FIG. 4). And of course orifices 105 will escape as the vertex formed by brace pivot 99 recedes to an acute angle. When the frame sides are stretched apart during erection of the frame, orifices 105 will be swung around into proper alignment immediately above shelf 112 to register with rods 111. The shelf should be pushed downwardly, and the locking rods 111 will then move upwardly when shelf 112 is released, penetrating the aligned orifices 105 to lock the foldable braces.

To readily facilitate registration of the brace orifices 105 with the locking pins 111 aforedescribed, and to further prevent over extension of the parallelogram linkages during frame erection, I have provided a resilient, extension limiting means 120. Extension limiting system 120 comprises a flexible, multiple linked chain element 124 extending from frame side 37 to the upper support block 71, and a companion similarly linked chain 125 on the opposite side. These chains readily deform to the position seen in FIG. 4 when the frame sides are moved together, but when they elongate and become tensioned, they help maintain the frame in proper alignment.

Proper alignment of the frame sides is encouraged by the link configuration. Each of the flat individual parallelogram linkage members 42–45, for example, occupies a plane that is substantially normal to the supporting surface 16. The plane occupied by the flat brace means 97, 98, on the other hand, is substantially parallel with the supporting surface 16, and perpendicular to the plane occupied by the sides 37 and 38 of the frame. This mutually orthogonal relationship between parts is preserved and emphasized by cooperation between the extension limiting means 120, the brace means 94, and the parallelogram linkage system 40.

Figure 7:
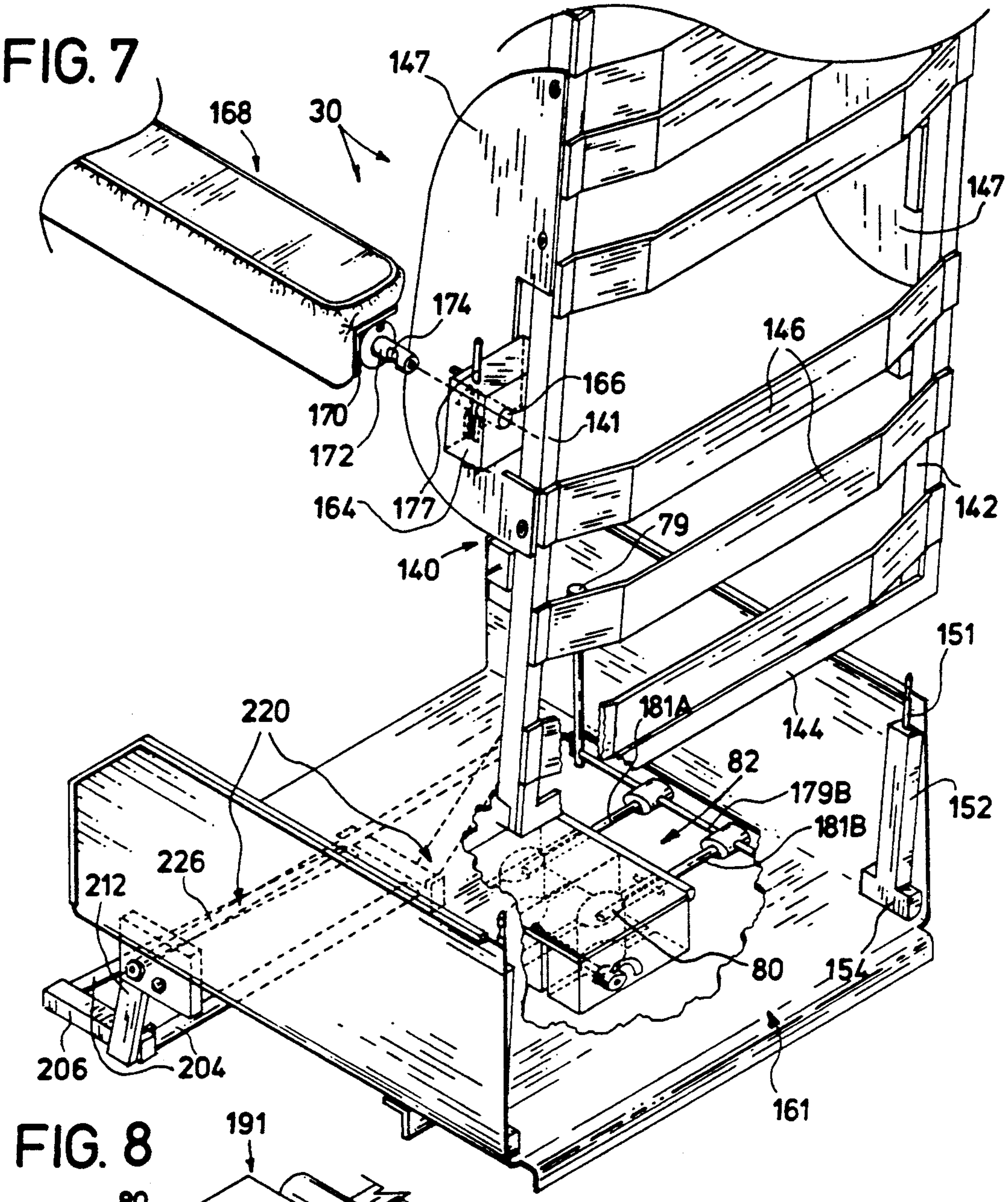
FIG. 7 is a partially exploded, fragmentary isometric view of the preferred chair assembly, with portions thereof broken away or shown in section for clarity.
Figure 8:
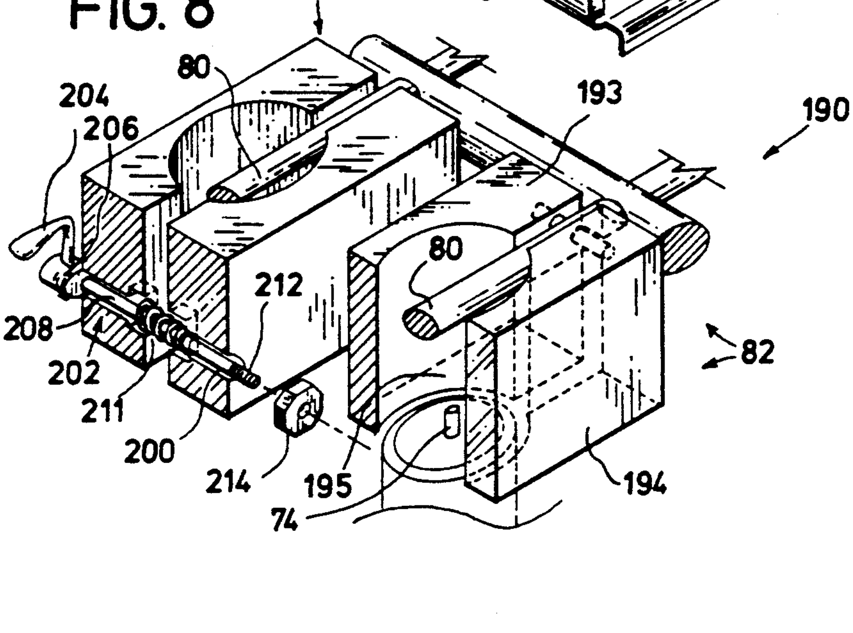
FIG. 8 is an enlarged fragmentary, isometric view of the preferred chair locking blocks, with portions thereof broken away or shown with phantom lies for clarity.

Turning now to FIGS. 7–8, a preferred chair has been generally designated by the reference numeral 30. Chair 30 includes an upright back generally designated by the reference numeral 140, comprising a pair of spaced apart stanchions 141, 142 forming a rigid back with base member 144. A plurality of cross pieces 146 extends between the frame sides 141, 142, to form a desired mounting for the cushion (not shown). A forwardly projecting side 147 is secured to each of the sides 141, 142 externally. Frame stanchions 141 and 142 are appropriately orificed to snap-fit to upwardly extending pins 151 emanating from the retainer blocks 152 welded at their base 154 to the bottom sheet metal piece 161.

Stanchions 141 and 142 also include suitable rigid mounting blocks 164 having passageways 166 defined therein for removably mounting the removable arm rests 168. Each arm rest is braced with an internal angle iron strut 170 terminating in a follower pin 172 adapted to be inserted into orifice 166. A notch 174 cut in pin 172 will removably register with a spring biased follower pin 177 depending from block 164. Thus when follower pin 177 is manually manipulated, it will be drawn out of engagement with notch 174 for release of arm 168.

The bottom 161 of the chair mounts a cam-activated mounting block system 82 into which the upper portions of the previously described cylinders are compressively and removably fitted. As best seen in FIG. 7 the block system 82 is secured beneath the frame bottom at the center. Lever 79 tilts cross piece 179B to operate both rods 181A and 181B to deflect remote tips 80 and thus activate the cylinders' valves 74.

For positive locking the locking block system 82 comprises two separate blocks 190, 191 of generally cubical geometry. Each block includes a separate half portion 193, 194, having segments of a generally circular bore 195 into which the pneumatic cylinders are fitted when the chair is mounted to the frame. The actuator tip 80 extends into this bore transversely across the top, and can be deflected by the actuating lever 79 (FIG. 7) to deflect the tip of the cylinder 74.

Each block has a transverse bore 200 into which a machine bolt 202 driven by a cam handle 204 is received. This bolt includes a head 206 integral with a non-threaded shaft portion 208 and a central, spring loaded portion 211. A terminal threaded portion 212 is mated to nut 214 to maintain the bolt 202 in place. When handle 204 is rocked back and forth to cam the bolt 202, the block halves will either be pulled together in compressive engagement about the cylinder, or released for removal of the chair. Since the handles 204 are conveniently accessible immediately beneath the chair bottom 161, quick removal of the chair is insured. On the other hand, since twin cylinders are used, the chair is inherently aligned over the frame. At the same time, the "squareness" of the frame when it is erected is insured through the previously discussed linkages and brace means so that the chair will sit absolutely perpendicularly upon the power pack and the frame for purposes of alignment.

Figure 9:
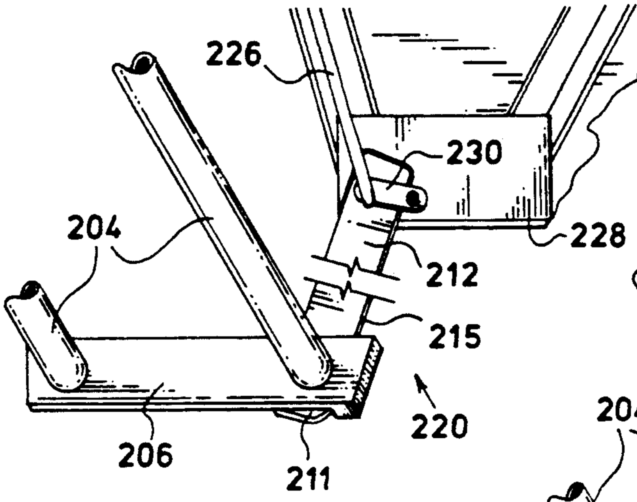
FIG. 9 is fragmentary, pictorial view illustrating the preferred footrest assembly.
Figure 10:
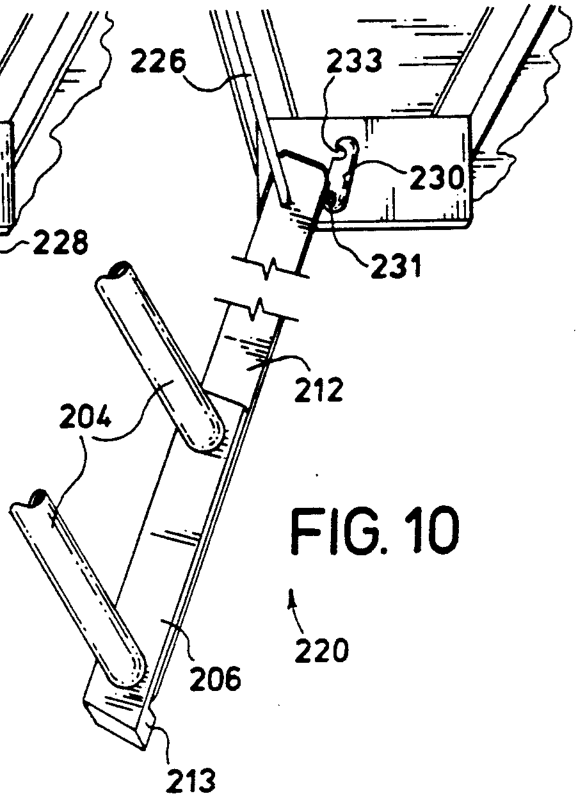
FIG. 10 is an enlarged fragmentary, elevational view of the footrest locking latch.
Figure 11:
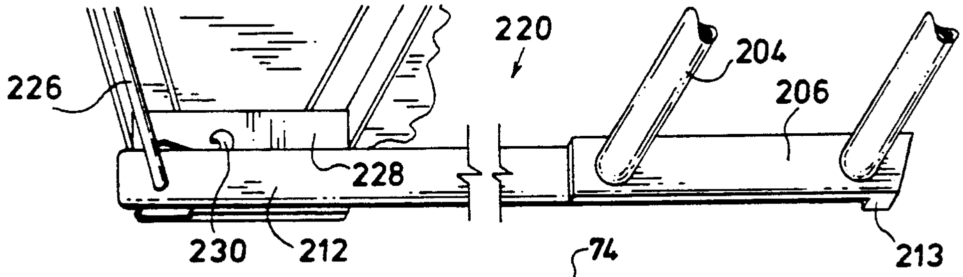
FIG. 11 is an enlarged fragmentary, isometric view illustrating the preferred footrest assembly folded under the frame
Figure 6:
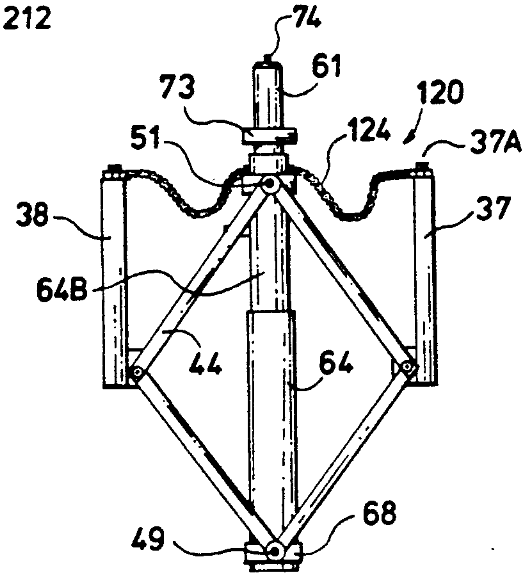
FIG. 6 is a fragmentary, sectional view taken generally along line 6—6 of FIG. 4.

With reference now to FIGS. 9–11, the foot rest emanating from the bottom of the chair has been generally designated by the reference numeral 220. FIGS. 9–11 are best appreciated by viewing underneath the chair from a position generally beneath and to the left of FIG. 7. The user's feet are placed upon one or more of the bars 204, emanating across the front of the apparatus between footrest side plates 206. These side plates are foldably pivoted to the end 211 of mounting bars 212. Because of the pivotal arrangement of the footrest, the bars 204 may be rotated upwardly as viewed in FIG. 10, or maintained in the deployed position as seen in FIG. 9. The appropriate curved surface of end 211 mates with the underside of the ledge 213 formed in the end of plate 206, so that when rotated to the deployed position as in FIG. 9, the ledge will abut the edge 215 of bar 212 to prevent further rotation.

At the same time the downwardly projecting bar can be deflected as well. This bar projects downwardly from the underside of the chair at either side. Bars 212 are coupled together by an elongated extension 226 that extends therebetween for synchronization. Bar 212 is pivoted to a mounting plate 228, and when moved to the desired position a rotatable latch 230 pivoted at 231 may be moved manually to engage or disengage from the rods 226. The hook portion 233 of the latch 230 simply captivates rod 226 to adjust the footrest supports into the desired position. Since the footrests are synchronized with rods 226, and since the ledge 213 prevents over rotation of the support bars 204 by engaging edge 215 (FIG. 9), the foot apparatus can immediately be rotated into the desired position.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A collapsible wheelchair comprising:

seat means for receiving and supporting a user of said wheelchair;

selectively collapsible frame means for suspending said seat means;

means for removably mounting said seat means to said frame means;

power pack means operatively associated with said frame means for extending and/or retracting said seat means relative to said frame means, said power pack means comprising extensible sleeve means coupled to said frame means, and cylinder means operatively associated with said sleeve means for raising or lowering said seat means, said cylinder means comprising a pair of pneumatic cylinders;

wheel means for suspending and propelling said wheelchair over a supporting surface; and, wherein said frame means comprises:

a pair of rigid, spaced apart sides;

a foldable linkage assembly for mechanically linking said sides together and enabling them to fold toward or away from one another, said linkage assembly comprising a pair of spaced apart parallelogram linkages interconnected between said sides and said power pack means;

foldable brace means extending between said sides for reinforcing said frame means; and, means for selectively locking said foldable brace means when said frame means is deployed.

2. The wheelchair as defined in claim 1 further comprising extension limiting means for preventing overextension of said brace means.

3. A collapsible wheelchair comprising:

seat means for receiving and supporting a user of said wheelchair, said seat means comprising a pair of selectively removable arm rests and a foldable foot rest;

selectively collapsible frame means for suspending said seat means;

means for removably mounting said seat means to said frame means;

power pack means operatively associated with said frame means for extending and/or retracting said seat means relative to said frame means, said power pack means comprising extensible sleeve means coupled to said frame means, and cylinder means operatively associated with said sleeve means for raising or lowering said seat means, said cylinder means comprising a pair of pneumatic cylinders;

removable drive wheel means for suspending and propelling said frame means over a supporting surface;

caster wheel means for supporting said frame means in cooperation with said drive wheel means;

auxiliary wheel means secured to said frame means for selectively supporting said wheelchair when said drive wheel means are removed, and, wherein said frame means comprises:

a pair of rigid, spaced apart sides;

a foldable linkage assembly for mechanically linking said sides together and enabling them to fold toward or away from one another, said linkage assembly comprising a pair of spaced apart parallelogram linkages interconnected between said sides and said power pack means;

foldable brace means extending between said sides for reinforcing said frame means; and, means for selectively locking said foldable brace means when said frame means is deployed.

4. The wheelchair as defined in claim 3 including extension limiting means for preventing overextension of said brace means.

5. A wheelchair that can be conveniently folded between collapsed and deployed configurations in the field, said wheelchair comprising:

seat means for receiving and supporting a user of said wheelchair, said seat means comprising a pair of selectively removable arm rests and a foldable foot rest;

frame means for mounting said seat means, said frame means operable to maintain dynamic squareness during folding and unfolding;

means for removably mounting said seat means to said frame means;

power pack means operatively associated with said frame means for extending and/or retracting said seat means relative to said frame means, said power pack means comprising extensible sleeve means coupled to said frame means, and cylinder means operatively associated with said sleeve means for raising or lowering said seat means, said cylinder means comprising a pair of pneumatic cylinders;

removable drive wheel means for suspending and propelling said frame means over a supporting surface;

caster wheel means for supporting said frame means in cooperation with said drive wheel means;

auxiliary wheel means secured to said frame means for selectively supporting said wheelchair when said drive wheel means are removed, and, wherein said frame means comprises:

a pair of rigid, spaced apart sides;

a foldable linkage assembly for mechanically linking said sides together and enabling them to fold toward or away from one another, said linkage assembly comprising a pair of spaced apart parallelogram linkages interconnected between said sides and said power pack means;

foldable brace means extending between said sides for reinforcing said frame means; and, means for selectively locking said foldable brace means when said frame means is deployed; and, wherein said foldable linkage assembly is generally perpendicular to said sides and said supporting surface;

said foldable brace means is generally perpendicular to said sides and said linkage assembly to promote stability of said frame means during folding and unfolding.

6. The wheelchair as defined in claim 5 further comprising block means for interconnecting said seat means to said cylinder means, said block means comprising:

a pair of rigid halves permanently mounted to the underside of said seat means;

an orifice defined in said block means between said halves for receiving at least a portion of said cylinders; and, cam means extending between said halves for selectively opening and closing said block means to either release or captivate said seat means.

* * * * *